US012763430B2

(12) United States Patent
Liu et al.

(10) Patent No.: US 12,763,430 B2
(45) Date of Patent: Oct. 13, 2026

(54) SEPARATOR, PREPARATION METHOD THEREFOR, AND RELATED SECONDARY BATTERY, BATTERY MODULE, BATTERY PACK, AND POWER CONSUMING DEVICE THEREOF

(71) Applicant: CONTEMPORARY AMPEREX TECHNOLOGY (HONG KONG) LIMITED, Hong Kong (CN)

(72) Inventors: Feng Liu, Ningde (CN); Yulei Fan, Ningde (CN); Wei Zhong, Ningde (CN); Xiaoming Ge, Ningde (CN); Chuying Ouyang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 187 days.

(21) Appl. No.: 18/628,843

(22) Filed: Apr. 8, 2024

(65) Prior Publication Data

US 2024/0274977 A1 Aug. 15, 2024

Related U.S. Application Data

(63) Continuation of application No. PCT/CN2022/111710, filed on Aug. 11, 2022.

(51) Int. Cl.
*H01M 50/446* (2021.01)
*H01M 50/403* (2021.01)
(Continued)

(52) U.S. Cl.
CPC ....... *H01M 50/446* (2021.01); *H01M 50/403* (2021.01); *H01M 50/414* (2021.01);
(Continued)

(58) Field of Classification Search
CPC ............ H01M 50/446; H01M 50/403; H01M 50/414; H01M 50/434; H01M 50/443;
(Continued)

(56) References Cited

U.S. PATENT DOCUMENTS 10,862,093 B2 12/2020 Hatta et al.
2015/0349312 A1* 12/2015 Ha .................. H01M 10/0525 429/145

(Continued)

FOREIGN PATENT DOCUMENTS

CN 103035866 A 4/2013
CN 104081576 A 10/2014

(Continued)

OTHER PUBLICATIONS

WO_2016000276_A1 Translation (Year: 2016).*

(Continued)

*Primary Examiner* — In Suk C Bullock
(74) *Attorney, Agent, or Firm* — K&L Gates LLP

(57) ABSTRACT

The present application relates to a separator, comprising: two layers of substrate and a coating formed between the two layers of substrate, wherein the coating contains inorganic particles, and 30 wt % to 70 wt % of the inorganic particles have a surface coated with a coating layer, and 70 wt % to 30 wt % of the inorganic particles have an uncoated surface, based on the total weight of the inorganic particle. The separator may realize a high mechanical strength, a high wettability, and a good interfacial bonding, and may also effectively inhibit the growth of lithium dendrites, and thus improve the cycling performance of a secondary battery.

18 Claims, 2 Drawing Sheets

(51) Int. Cl.

| | |
|---|---|
| ***H01M 50/414*** | (2021.01) |
| ***H01M 50/434*** | (2021.01) |
| ***H01M 50/443*** | (2021.01) |
| ***H01M 50/491*** | (2021.01) |

(52) U.S. Cl.
CPC ....... *H01M 50/434* (2021.01); *H01M 50/443* (2021.01); *H01M 50/491* (2021.01)

(58) Field of Classification Search
CPC ............. H01M 50/491; H01M 50/411; H01M 50/417; H01M 50/426; H01M 50/431; H01M 50/451; H01M 50/457; H01M 50/489; H01M 50/409; H01M 2220/20; H01M 10/052; H01M 10/0525; Y02E 60/10; Y02P 70/50
See application file for complete search history.

(56) References Cited

U.S. PATENT DOCUMENTS

| | | | | |
|---|---|---|---|---|
| 2016/0226050 | A1* | 8/2016 | Abe .................... | H01M 50/426 |
| 2021/0036286 | A1* | 2/2021 | Lee ....................... | H01M 10/42 |
| 2021/0175582 | A1 | 6/2021 | Lee | |
| 2021/0399350 | A1 | 12/2021 | Saito et al. | |

FOREIGN PATENT DOCUMENTS

| | | | | |
|---|---|---|---|---|
| CN | 105304846 A | 2/2016 | | |
| CN | 207818722 U | 9/2018 | | |
| CN | 112670662 A | 4/2021 | | |
| CN | 113675533 A | 11/2021 | | |
| CN | 114171849 A | 3/2022 | | |
| CN | 114243214 A | 3/2022 | | |
| JP | 2007035542 A | 2/2007 | | |
| JP | 2017062962 A | 3/2017 | | |
| KR | 1020170025434 A | 3/2017 | | |
| WO | 2011013300 A1 | 2/2011 | | |
| WO | 2015034080 A1 | 3/2015 | | |
| WO | WO-2016000276 A1 * | 1/2016 | ............ | C08J 7/0427 |

OTHER PUBLICATIONS

Notice of Reasons for Refusal received in the counterpart JP application 2024-504483, mailed on Mar. 10, 2025, 11 pages with English translation.
The extended European search report received in the counterpart European Application 22954486.1, mailed on Jan. 20, 2025.
Decision to Grant a Patent received in the counterpart JP application 2024-504483, mailed on Aug. 18, 2025, 5 pages with English translation.
Request for the Submission of an Opinion received in the counterpart KR application 10-2024-7002806, mailed on Jun. 16, 2025, 18 pages with English translation.
International Search Report received in the corresponding International Application PCT/CN2022/111710, mailed Feb. 22, 2023.

* cited by examiner

SEPARATOR, PREPARATION METHOD THEREFOR, AND RELATED SECONDARY BATTERY, BATTERY MODULE, BATTERY PACK, AND POWER CONSUMING DEVICE THEREOF

CROSS REFERENCE TO RELATED MATTER

This application is a continuation of international application PCT/CN2022/111710, filed Aug. 11, 2022 and entitled "SEPARATOR, PREPARATION METHOD THEREFOR, AND RELATED SECONDARY BATTERY, BATTERY MODULE, BATTERY PACK, AND POWER CONSUMING DEVICE THEREOF", the entire content of which is hereby incorporated by reference in its entirety.

TECHNICAL FIELD

The present application relates to the technical field of secondary batteries, and in particular to a separator, a preparation method therefor, and a related secondary battery, battery module, battery pack, and power consuming device thereof.

BACKGROUND ART

In recent years, with an increasingly wide application range of lithium-ion batteries, the lithium-ion batteries are widely used in energy storage power systems such as hydroelectric, thermal, wind and solar power stations, as well as power tools, electric bicycles, electric motorcycles, electric vehicles, military equipment, aerospace and other fields. Due to the great development of lithium ion batteries, higher requirements have also been placed on the lithium ion batteries in terms of energy density, cycling performance, safety performance, etc.

In the structure of secondary batteries, a separator is one of the key inner layer components, and has an important influence on the comprehensive performance of the lithium-ion batteries. However, the performance of the separator used in the prior art is still to be further improved.

SUMMARY OF THE INVENTION

The present application has been made in view of the above problems and aims to provide a separator having a high mechanical strength, a high wettability, and a good interfacial bonding property, and also enabling a secondary battery containing same to have an improved cycling performance.

In order to achieve the above object, in a first aspect, the present application provides a separator comprising: two layers of substrate and a coating formed between the two layers of substrate, wherein the coating contains inorganic particles, and 30 wt % to 70 wt % of the inorganic particles have a surface coated with a coating layer, and 70 wt % to 30 wt % of the inorganic particles have an uncoated surface, based on the total weight of the inorganic particle.

By means of arranging a certain proportion of inorganic particles having a surface coated with a coating layer and inorganic particles having an uncoated surface between the substrates, the separator may have a relatively high mechanical strength, a high wettability, and a good interfacial bonding property, and may also effectively inhibit the growth of lithium dendrites.

In any embodiment, the inorganic particles are selected from at least one of Si, an Si oxide, an Si nitride, an Fe oxide, an Fe nitride, an Fe oxysalt, an Sn oxide, a Ti oxide, a Ti nitride, a Cu oxide, a Cu nitride, an Mn oxide, a Ge oxide, an Ni oxide, $ZrO_2$, ZnO and AlN, and optionally, the inorganic particles are selected from at least one of $SiO_2$, Si, SiO, $SnO_2$, ZnO, $Fe_2O_3$, NiO, CuO, $TiO_2$ and $FePO_4$.

In any embodiment, the inorganic particles have a particle size Dv50 of 0.01 μm to 10 μm, optionally, 0.05 μm to 0.5 μm.

The inorganic particle of the present application may ensure a better adhesion of the inorganic particle to the substrate, and in particular, may improve an air permeability of the separator, make the conduction of ions better, and contribute to the capacity and the cycle life of a battery. Due to the introduction of the inorganic particle having a relatively small particle size, the porosity of the separator is also obviously improved, and the diffusion of lithium is accelerated, but the impedance of the battery is not obviously increased.

In any embodiment, a material forming the coating layer is selected from at least one of polyvinylidene fluoride (PVDF), polydopamine (PDA), polyaniline (PAN), polyimide (PI), and polymethyl methacrylate (PMMA).

The particle may also be better fixed on a surface of the substrate by means of coating the inorganic particle with a polymeric material having a bonding property.

In any embodiment, in the inorganic particles having a surface coated with the coating layer, a mass ratio of the coating layer to the coated inorganic particle is (0.05-2):1, optionally (0.1-0.6):1.

By means of coating the inorganic particle with the coating layer of the above mass, a mechanical property and a wetting property of the separator may be better ensured.

In any embodiment, the coating layer has a thickness of 3 nm to 10 nm, optionally 5 nm to 8 nm.

In any embodiment, the coating has a thickness of 1 μm to 10 μm, optionally 2 μm to 8 μm; and/or, the coating has a coating amount of 5 $g/m^2$ to 50 $g/m^2$, optionally 10 $g/m^2$ to 20 $g/m^2$; and/or, the separator has a thickness of 10 μm to 20 μm.

In the present application, by means of setting the thickness of the coating within the above range, it may be better ensured that the internal resistance of a battery is within an appropriate range, so as to enable a lithium ion to transmit through the separator more easily and thus ensure the battery performance.

In any embodiment, the coating contains 80 wt % to 99 wt %, optionally 85 wt % to 96.5 wt % of the inorganic particle of the present application; and/or, 1 wt % to 5 wt % of a binder; and/or, 1 wt % to 3 wt % of a dispersant; and/or, 0.1 wt % to 1 wt % of a thickener, all based on the total weight of the coating.

By means of using the various components at the above proportions, it may be better ensured that the obtained separator may achieve the technical effect of the present invention.

In any embodiment, the binder is selected from at least one of sodium carboxymethylcellulose (CMC) and styrene butadiene rubber (SBR).

The binder may better ensure that the coating of the separator of the present invention has a better mechanical performance and is not easy to break.

In any embodiment, the dispersant is selected from at least one of hydrolytic polymaleic anhydride, an acrylic block polymer, a polyester block polymer, a polyethylene glycol-type polyol, and a polyethyleneimine derivative.

The dispersant may better ensure a dispersion uniformity between the inorganic particles.

In any embodiment, the thickener is selected from at least one of sodium carboxymethylcellulose, methylcellulose, hydroxyethyl cellulose, hydroxypropyl methylcellulose, polyacrylate, polyurethane, and polyether.

The thickener may improve the viscosity of the coating material and enable the coating material in a uniform and stable state.

In any embodiment, a material forming the substrate is selected from at least one of polypropylene, polyethylene, polyamide, polyester, polytetrafluoroethylene, polyvinylidene fluoride, and polyvinyl chloride.

The substrate is in the form of a polymer, and has a relatively good mechanical strength and chemical resistance.

In any embodiment, the substrate has a thickness of 3 μm to 30 μm, optionally 5 μm to 25 μm.

In any embodiment, the substrate is a porous film having a porosity of 30% to 80%, optionally 40% to 50%.

In any embodiment, the material forming the substrate has a number-average molecular weight of 100,000-1,000,000.

In a second aspect, the present application provides a method for preparing a separator comprising: two layers of substrate and a coating formed between the two layers of substrate, wherein the coating contains inorganic particles, and 30 wt % to 70 wt % of the inorganic particles have a surface coated with a coating layer, and 70 wt % to 30 wt % of the inorganic particles have an uncoated surface, based on the total weight of the inorganic particle;

the method comprises the following steps:

(1) uniformly dispersing the inorganic particle in an organic solvent to obtain a dispersion of the inorganic particle;

(2) adding a material forming the coating layer to the dispersion obtained in step (1) to obtain the inorganic particle having a surface coated with the coating layer;

(3) adding the inorganic particle having a surface coated with the coating layer obtained in step (2) and the inorganic particle having an uncoated surface to an organic solvent, adding a binder, a dispersant, and a thickener, and then stirring same until uniform to obtain a coating material for coating the substrate; and (4) uniformly coating one substrate with the coating material obtained in step (3), and then covering the side, coated with the coating material, of the substrate with the other substrate to obtain the separator.

By means of the above method, it may be ensured that the prepared separator has the effects of the present invention, that is, a relatively high mechanical strength, a high wettability, and a good interfacial bonding property, and may also effectively inhibit the growth of lithium dendrites.

In any embodiment, in step (1), a weight ratio of the inorganic particle to the organic solvent is 1:(15-45).

By means of the above proportion, it may be better ensured that the inorganic particle may fully contact with the material forming the coating layer, so as to achieve a uniform coating.

In any embodiment, in step (2), a weight ratio of the material for forming the coating layer to the inorganic particle is (1-10):1, optionally (2-6):1.

The weight ratio may ensure that the surfaces of all the inorganic particles are fully coated.

In any embodiment, in step (3), the solid content of the coating material is 30 wt % to 60 wt %.

The moderate solid content may ensure that the finally coated coating may achieve the desired performance.

In any embodiment, the organic solvent in steps (1) and (3) may be the same or different, and optionally, the organic solvent is selected from at least one of N,N-dimethylformamide (DMF), N-methylpyrrolidone (NMP), N,N-dimethylacetamide (DMAC), dimethylsulfoxide (DMSO), and tetrahydrofuran (THF).

In any embodiment, in step (4), after the other substrate covers the side, coated with the coating material, of the substrate, hot-pressing and vacuum-drying are performed; and/or, the hot-pressing is performed by means of a hot press at a pressure of 3 MPa to 8 MPa, and/or at a temperature of 100° C. to 150° C., and/or for 1 minute to 10 minutes; and and/or, the drying is performed at a temperature of 80° C. to 120° C.

In a third aspect, the present application provides a secondary battery, comprising a separator of the first aspect of the present application or a separator prepared by a method according to the second aspect of the present application.

In a fourth aspect, the present application provides a battery module comprising a secondary battery of the third aspect of the present application.

In a fifth aspect, the present application provides a battery pack comprising a battery module of the fourth aspect of the present application.

In a sixth aspect, the present application provides a power consuming device comprising at least one of a secondary battery of the third aspect of the present application, a battery module of the fourth aspect of the present application, or a battery pack of the fifth aspect of the present application.

The separator of the present application has a better mechanical strength, wetting performance, and absorption rate to an electrolyte solution. A secondary battery using the separator of the present application has a better cycling performance under both low rate and high rate current cycles.

Since the power consuming device of the present application comprises at least one of the secondary battery, the battery module or the battery pack provided by the present application, the device has at least the same advantages as the secondary battery.

LIST OF REFERENCE NUMERALS

Figure 1:
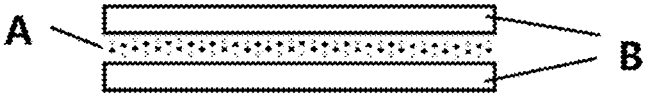
FIG. 1 is a schematic diagram of a separator according to an embodiment of the present application.

1 battery pack; 2 upper box body; 3 lower box body; 4 battery module; 5 secondary battery; 51 shell body; 52 electrode assembly; 53 top cover assembly; A coating; and B substrate.

DETAILED DESCRIPTION OF EMBODIMENTS

Hereafter, embodiments of the separator of the present application, a preparation method therefor, and the related secondary battery, battery module, battery pack and power consuming device thereof are specifically disclosed in the detailed description with reference to the accompanying drawings as appropriate. However, unnecessary detailed illustrations may be omitted in some instances. For example, there are situations where detailed description of well-known items and repeated description of actually identical structures are omitted. This is to prevent the following description from being unnecessarily verbose, and facilitate understanding by those skilled in the art. Moreover, the accompanying drawings and the descriptions below are provided for enabling those skilled in the art to fully understand the present application, rather than limiting the subject matter disclosed in the claims.

Hereafter, embodiments of the separator and the preparation method therefor, the secondary battery, the battery module, the battery pack, and the power consuming device of the present application are specifically disclosed in the detailed description with reference to the accompanying drawings as appropriate. However, unnecessary detailed illustrations may be omitted in some instances. For example, there are situations where detailed description of well-known items and repeated description of actually identical structures are omitted. This is to prevent the following description from being unnecessarily verbose, and facilitate understanding by those skilled in the art. Moreover, the accompanying drawings and the descriptions below are provided for enabling those skilled in the art to fully understand the present application, rather than limiting the subject matter disclosed in the claims.

The "range" disclosed in the present application is defined in the form of lower and upper limits. A given range is defined by means of selecting a lower limit and an upper limit, and the selected lower and upper limits define the boundaries of the particular range. A range defined in this manner may be inclusive or exclusive, and may be arbitrarily combined, that is, any lower limit may be combined with any upper limit to form a range. For example, if the ranges 60-120 and 80-110 are listed for a particular parameter, it should be understood that the ranges 60-110 and 80-120 are also contemplated. Additionally, if minimum range values 1 and 2 are listed and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, wherein both a and b are real numbers. For example, the numerical range "0-5" means that all the real numbers between "0-5" have been listed herein, and "0-5" is just an abbreviated representation of combinations of these numerical values. In addition, when a parameter is expressed as an integer ≥2, it is equivalent to disclosing that the parameter is, for example, an integer of 2, 3, 4, 5, 6, 7, 8, 9, 10, 11, 12, etc.

All the embodiments and optional embodiments of the present application may be combined with one another to form a new technical solution, unless otherwise stated.

All technical features and optional technical features of the present application may be combined with one another to form a new technical solution, unless otherwise stated.

Unless otherwise stated, all the steps of the present application may be performed sequentially or randomly, preferably sequentially. For example, the method comprising steps (a) and (b) indicates that the method may comprise steps (a) and (b) performed sequentially, and may also comprise steps (b) and (a) performed sequentially. For example, reference to "the method may further comprise step (c)" indicates that step (c) may be added to the method in any order, e.g., the method may comprise steps (a), (b) and (c), or steps (a), (c) and (b), or steps (c), (a) and (b), etc.

The terms "comprise" and "include" mentioned in the present application are open-ended or may also be closed-ended, unless otherwise stated. For example, "comprise" and "include" may mean that other components not listed may further be comprised or included, or only the listed components may be comprised or included.

In the present application, the term "or" is inclusive unless otherwise stated. For example, the phrase "A or B" means "A, B, or both A and B". More specifically, the condition "A or B" is satisfied by any one of the following conditions: A is true (or present) and B is false (or not present); A is false (or not present) and B is true (or present); or both A and B are true (or present).

All the embodiments and optional embodiments of the present application may be combined with one another to form a new technical solution, unless otherwise stated.

All technical features and optional technical features of the present application may be combined with one another to form a new technical solution, unless otherwise stated.

In the present application, all the operations are performed at normal temperature (25° C.) and normal pressure (101 kPa), unless otherwise stated.

The inventors have found in studies that in the prior art, although a coating material is used to coat the inorganic particle and to coat the inorganic particle on the substrate, the prepared separator has a better mechanical performance and wetting performance, the prepared secondary battery is not resistant to lithium dendrites and has a poor cycling performance. Without bound by any theory, it is believed now that since the inorganic particle is completely coated, the grown lithium dendrites cannot directly contact and react with the inorganic particle, such that a dendrite resistance of the separator is reduced. The inventors have unexpectedly found that by means of using a certain proportion of inorganic particles having a surface coated with a coating layer and inorganic particles having an uncoated surface, and coating the inorganic particles onto a substrate, the prepared separator may achieve a high mechanical strength, a high wettability, and a good interfacial bonding (particularly, an absorption rate to an electrolyte solution), and may also effectively inhibit the growth of lithium dendrites, thereby improving the cycling performance of a secondary battery.

To this end, in the first aspect, the present application provides a separator comprising: two layers of substrate and a coating formed between the two layers of substrate, wherein the coating contains inorganic particles, and 30 wt % to 70 wt % of the inorganic particles have a surface coated with a coating layer, and 70 wt % to 30 wt % of the inorganic particles have an uncoated surface, based on the total weight of the inorganic particle. In some embodiments, referring to FIG. 1, the separator comprises two layers of substrate B and a coating A formed between the two layers of substrate B.

In some embodiments, the coating contains inorganic particles, wherein 40 wt % to 60 wt %, optionally 45 wt % to 55 wt % of the inorganic particles have a surface coated with a coating layer, and 60 wt % to 40 wt %, optionally 55 wt % to 45 wt % of the inorganic particles have an uncoated surface, based on the total weight of the inorganic particle.

The separator containing the two layers of substrate of the present application may prevent the inorganic particle from directly contacting with positive and negative electrodes, so as to avoid a lot of side reactions. These side reactions consume lithium, and reduce the battery capacity and cycle life. Compared with a traditional separator with two sides coated with an inorganic particle coating, the separator of such a sandwich structure has a more stable structure.

On the basis of the separator of the present application satisfying the above design conditions, if one or more of the following conditions are further optionally satisfied, the performance of the secondary battery may be further improved.

In some embodiments, the inorganic particles are selected from at least one of Si, an Si oxide, an Si nitride, an Fe oxide, an Fe nitride, an Fe oxysalt, an Sn oxide, a Ti oxide, a Ti nitride, a Cu oxide, a Cu nitride, an Mn oxide, a Ge oxide, an Ni oxide, $ZrO_2$, ZnO and AlN, and optionally, the inorganic particles are selected from at least one of $SiO_2$, Si, SiO, $SnO_2$, ZnO, $Fe_2O_3$, NiO, CuO, $TiO_2$ and $FePO_4$. The inorganic particle has a good mechanical strength, a high electrochemical stability, and an excellent wettability to an electrolyte solution, and may ensure a better realization of the technical effect of the present invention.

In some embodiments, the inorganic particle is selected from at least one of $SiO_2$, $Fe_2O_3$, $SnO_2$, $TiO_2$ and CuO. Silicon dioxide may be subjected to a lithium intercalation reaction to absorb Li dendrites in time so as to avoid a further growth of the Li dendrites; Ferric oxide may be subjected to an alloying reaction with the lithium dendrites, has a high specific capacity, a good stability, and a low electronic conductivity, and facilitates the consumption of the lithium dendrites, and also reduces the internal resistance brought by the separator; titanium dioxide may be subjected to an intercalation reaction with the lithium dendrites to generate lithium titanate, has a high theoretical capacity and a stable structure, and the structure of the oxide may not be changed greatly after the lithium intercalation; and copper oxide is subjected to a conversion reaction with lithium to produce amorphous $Li_2O$ and a nanosized metallic copper particle, and the produced nanosized copper particle may further react with $Li_2O$ to generate an oxide, such that the oxide has a relatively high specific capacity and a good cycling performance.

In some embodiments, the inorganic particle has a particle size Dv50 of 0.01 μm to 10 μm, optionally, 0.05 μm to 0.5 μm, further optionally, 0.08 μm to 0.3 μm. The particle size of the inorganic particle of the present application within the above range may ensure a better adhesion of the inorganic particle to the substrate, and in particular, may improve an air permeability of the separator, make the conduction of ions better, and contribute to the capacity and the cycle life of a battery. Due to the introduction of the inorganic particle having a relatively small particle size, the porosity of the separator is also obviously improved, and the diffusion of lithium is accelerated, but the impedance of the battery is not obviously increased.

Dv50 has a meaning well-known in the art and may be measured by means of an instrument and method known in the art. For example, the Dv50 may be determined by means of referring to GB/T 19077-2016 particle size distribution-laser diffraction method, using a laser particle size analyzer (for example, Master Size 3000).

In some embodiments, a material forming the coating layer is selected from at least one of polyvinylidene fluoride (PVDF), polydopamine (PDA), polyaniline (PAN), polyimide (PI), and polymethyl methacrylate (PMMA). The particle may also be better fixed on a surface of the substrate by means of coating the inorganic particle with a polymeric material having a bonding property.

In some embodiments, the material forming the coating layer has a number-average molecular weight of 10,000 to 1,000,000, optionally 15,000-100,000, and further optionally 20,000-80,000.

In the present application, the number-average molecular weight is determined by means of gel permeation chromatography (GPC) with reference to GB/T 21863-2008 "Gel Permeation Chromatography (GPC)-Tetrahydrofuran as Eluent Solvent".

In some embodiments, in the inorganic particles having a surface coated with a coating layer, a mass ratio of the coating layer to the coated inorganic particle is (0.05-2):1, optionally (0.1-0.6):1, further optionally (0.35-0.55):1.

In some embodiments, a mass ratio of the coating layer to all the inorganic particles is (0.05-0.5):1, optionally (0.1-0.4):1, further optionally (0.15-0.35):1. Here, it should be understood that the mass of all the inorganic particles does not contain the mass of the coating layer.

In some embodiments, the coating layer has a thickness of 3 nm to 10 nm, optionally 5 nm to 8 nm.

In the present application, the thickness of the coating layer may be determined by means of a scanning electron microscope (SEM). A determined value is an average value of a plurality of measured values (e.g., 10-100).

In some embodiments, the coating has a thickness of 1 μm-10 μm, optionally 2 μm-8 μm; and/or, the coating has a coating amount of 5 $g/m^2$ to 50 $g/m^2$, optionally 10 $g/m^2$ to 20 $g/m^2$; and/or, the separator has a thickness of 10 μm to 20 μm, further optionally 12 μm to 18 μm. In this context, the coating amount refers to a coating amount measured after the coating is dried, unless otherwise stated. A measurement method therefor is known to those skilled in the art, for example, the coating amount may be calculated by means of measuring the mass of the coating coated per unit area.

In the present application, by means of setting the thickness of the coating within the above range, it may be better ensured that the internal resistance of a battery is within an appropriate range, so as to enable a lithium ion to transmit through the separator more easily and thus ensure the battery performance.

In some embodiments, the coating contains 80 wt % to 99 wt %, optionally 85 wt % to 95 wt % of the inorganic particle of the present application; and/or, 1 wt % to 5 wt %, optionally 1.2 wt % to 3.0 wt % of a binder; and/or, 1 wt % to 3 wt %, optionally 1.2 wt % to 2.5 wt % of a dispersant; and/or, 0.1 wt % to 1 wt %, optionally 0.4 wt % to 1.5 wt % of a thickener, all based on the total weight of the coating. Here, it should be understood that the inorganic particle refers to the inorganic particle having an uncoated surface and the inorganic particle having a surface coated with a coating layer.

In some embodiments, the binder is selected from at least one of sodium carboxymethylcellulose (CMC) and styrene butadiene rubber (SBR); optionally, the binder is sodium carboxymethylcellulose (CMC).

In some embodiments, the dispersant is selected from at least one of hydrolytic polymaleic anhydride (CAS No. 26099-09-02), an acrylic block polymer, a polyester block polymer, a polyethylene glycol-type polyol, and a polyethyleneimine derivative.

In some embodiments, the hydrolytic polymaleic anhydride has a relative molecular weight of 400 and 800; and the acrylic block polymer, the polyester block polymer, the polyethylene glycol-type polyol, and the polyethyleneimine derivative have a number-average molecular weight generally of 50,000 to 1,000,000, optionally 60,000 to 800,000.

In some embodiments, the thickener is selected from at least one of sodium carboxymethylcellulose, methylcellulose, hydroxyethyl cellulose, hydroxypropyl methylcellulose, polyacrylate, polyurethane, and polyether.

The separator of the present application has a better hydrophilicity, may solve the problem of a poor affinity with an electrolyte solution having a strong polarity, such that the separator may absorb and maintain the electrolyte solution. In addition, a heat resistance and a mechanical performance of the separator may also be improved, such that the electrical properties and the safety of a battery are improved.

In the present application, in addition to the above components, the coating may further comprise other additives such as a surfactant for reducing the surface tension of the coating material and improving the affinity of the separator to the coating material, for example a fluorocarbon surfactant, a silane surfactant, a polyol surfactant, etc.; and a conductive agent for enhancing a conduction function of lithium ions, and commonly a carbon nanotube for improving the conductivity, strengthening a PVDF framework structure, etc.

In some embodiments, a material forming the substrate is selected from at least one of polypropylene, polyethylene, polyamide, polyester, polytetrafluoroethylene, polyvinylidene fluoride, and polyvinyl chloride.

In some embodiments, the substrate has a thickness of 3 μm to 30 μm, optionally, 5 μm to 25 μm, further optionally, 6 μm to 10 μm.

In some embodiments, the substrate is a porous film having a porosity of 30% to 80%, optionally 40% to 50%.

In some embodiments, the material forming the substrate has a number-average molecular weight of 100,000-1,000,000.

The lithium dendrites are inevitably generated during several charge and discharge processes of a lithium metal battery, continuously grow, and finally contact and pierce the separator, and contact with the coating. The separator of the present application comprises two layers of substrate and a coating formed between the two layers of substrate, and the coating contains some inorganic particles having an uncoated surface, which may react with lithium dendrites to consume the generated lithium, thereby inhibiting the growth of the lithium dendrites and preventing the short circuit of a battery. Meanwhile, the coating further comprises inorganic particles having a surface coated with a coating layer, which may improve the specific surface area and the micropore of the separator, such that a liquid absorption property, a liquid retention property, and a wettability of the separator may be further improved, the number of contact sites and a conduction path may be further improved, an ionic conductivity may be further enhanced, a conduction distance may be shortened, a concentration polarization may be reduced, and the fast charge performance of the battery may be further improved.

In a second aspect, the present application provides a method for preparing a separator comprising: two layers of substrate and a coating formed between the two layers of substrate, wherein the coating contains inorganic particles, and 30 wt % to 70 wt % of the inorganic particles have a surface coated with a coating layer, and 70 wt % to 30 wt % of the inorganic particles have an uncoated surface, based on the total weight of the inorganic particle;

the method comprises the following steps:

(1) uniformly dispersing the inorganic particle in an organic solvent to obtain a dispersion of the inorganic particle;
(2) adding a material forming the coating layer to the dispersion obtained in step (1) to obtain the inorganic particle having a surface coated with the coating layer;
(3) adding the inorganic particle having a surface coated with the coating layer obtained in step (2) and the inorganic particle having an uncoated surface to an organic solvent, adding a binder, a dispersant, and a thickener, and then stirring same until uniform to obtain a coating material for coating the substrate; and
(4) uniformly coating one substrate with the coating material obtained in step (3), and then covering the side, coated with the coating material, of the substrate with the other substrate to obtain the separator.

In some embodiments, in step (1), a weight ratio of the inorganic particle to the organic solvent is 1:(15-45), optionally 1:(16-30).

In some embodiments, in step (2), a weight ratio of the material used for forming the coating layer to the inorganic particle is (1-10):1, optionally (2-6):1.

In some embodiments, in step (2), the material forming the coating layer is added to the dispersion obtained in step (1), and stirred until uniform, followed by centrifuging, drying, and grinding.

In some embodiments, in step (2), the stirring is performed at a rotating speed of 500 rpm to 1,000 rpm, optionally 700 rpm to 900 rpm, optionally for 1 hour to 6 hours, optionally 2 hours to 4 hours.

In some embodiments, in step (2), the centrifugation is performed at a rotating speed of 8,000 rpm to 15,000 rpm, optionally 9,000 rpm to 12,000 rpm. It can be understood that after the centrifugation, a centrifugate is collected and dried.

In some embodiments, in step (2), the drying is performed at a temperature of 80-180° C., optionally 100-150° C., for 2 hours to 24 hours, optionally 5 hours to 15 hours.

In some embodiments, the particle size after the grinding is set at 1 um to 10 um, optionally 2 μm to 8 μm. It should be understood that the grinding in step (2) is performed to prevent the agglomeration of the inorganic particle, which does not change the particle size of the previously added inorganic particle itself. Therefore, in some embodiments, the particle size after the grinding in step (2) is set to be larger than the particle size of the inorganic particle.

In some embodiments, in step (3), the solid content of the coating material is 30 wt % to 60 wt %, optionally 40 wt % to 50 wt %.

The solid content of the coating material may be tested according to the following method:

taking a coating material with a weight of M1, putting same into an oven, and placing same at 120° C. for drying for 48 h, wherein the dried coating material has a weight of M2, the solid content=M2/M1×100%.

In some embodiments, in step (3), the stirring is performed at a rotating speed of 500 rpm to 1,000 rpm, optionally 700 rpm to 900 rpm, optionally for 0.5 hour to 5 hours, optionally 1.5 hours to 4 hours.

In step (3), the amounts of the binder, the dispersant, and the thickener are as described above.

In some embodiments, the organic solvent in steps (1) and (3) may be the same or different, and optionally, the organic solvent is selected from at least one of N,N-dimethylformamide (DMF), N-methylpyrrolidone (NMP), N,N-dimethylacetamide (DMAC), dimethylsulfoxide (DMSO), and tetrahydrofuran (THF).

In some embodiments, in step (4), the coating material may be coated by means of a coating method conventionally used in the art, for example, a blade coating method.

In some embodiments, in step (4), after the other substrate covers the side, coated with the coating material, of the substrate, hot-pressing and vacuum-drying are performed.

In some embodiments, in step (4), the hot-pressing is performed by means of a hot press at a pressure of 3 MPa to 8 MPa, optionally 4 MPa to 6 MPa, at a temperature of 100° C. to 150° C., optionally 110° C. to 140° C., and for 1 minute to 10 minutes, optionally 2 minutes to 8 minutes; and optionally, the drying is performed at a temperature of 80° C. to 120° C., optionally 90° C. to 110° C.

In some embodiments, in step (4), the vacuum-drying is performed for 6 hours to 15 hours, optionally 8 hours to 13 hours. In the present application, it should be understood that "vacuum-drying" refers to drying performed at a sub-atmospheric pressure, wherein an absolute pressure may be 0 to 100 KPa, optionally less than 75 KPa.

Herein, it may be understood that the inorganic particle used in step (1) is the inorganic particle having an uncoated surface; and likewise, the other substrate used in step (4) is a substrate having a surface not coated with a coating.

Herein, the two substrates used in step (4) are the same or different, optionally the same.

Secondary Battery

A secondary battery refers to a battery which may continue to service by means of activating an active material by means of charging after the battery is discharged.

Generally, the secondary battery comprises a positive electrode plate, a negative electrode plate, a separator, and an electrolyte. During the charge and discharge of the battery, active ions are intercalated and de-intercalated back and forth between the positive electrode plate and the negative electrode plate. The separator is arranged between the positive electrode plate and the negative electrode plate, and plays the role of separation. The electrolyte functions to conduct ions between the positive electrode plate and the negative electrode plate.

[Positive Electrode Plate]

The positive electrode plate generally comprises a positive electrode current collector and a positive electrode film layer arranged on at least one surface of the positive electrode current collector, wherein the positive electrode film layer comprises a positive electrode active material.

As an example, the positive electrode current collector has two surfaces opposite in its own thickness direction, and the positive electrode film layer is arranged on either or both of opposite surfaces of the positive electrode current collector.

In some embodiments, the positive electrode current collector may be a metal foil or a composite current collector. For example, as a metal foil, an aluminum foil may be used. The composite current collector may comprise a polymer material base layer and a metal layer formed on at least one surface of the polymer material base layer. The composite current collector may be formed by means of forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode active material may be a positive electrode active material known in the art for batteries. As an example, the positive electrode active material may comprise at least one of the following materials: a lithium-containing phosphate of an olivine structure, a lithium transition metal oxide, and their respective modified compounds. However, the present application is not limited to these materials, and other conventional materials that may be used as a positive electrode active material for batteries may also be used. These positive electrode active materials may be used alone or in combination of two or more. Among them, examples of the lithium transition metal oxide may include, but are not limited to, at least one of a lithium cobalt oxide (e.g. $LiCoO_2$), a lithium nickel oxide (e.g. $LiNiO_2$), a lithium manganese oxide (e.g. $LiMnO_2$ and $LiMn_2O_4$), a lithium nickel cobalt oxide, a lithium manganese cobalt oxide, a lithium nickel manganese oxide, a lithium nickel cobalt manganese oxide (e.g. $LiNi_{1/3}Co_{1/3}Mn1/3O_2$ (also abbreviated to as $NCM_{333}$), $LiNi_{0.5}Co_{0.2}Mn_{0.3}O_2$ (also abbreviated to as $NCM_{523}$), $LiNi_{0.5}Co_{0.25}Mn_{0.25}O_2$ (also abbreviated to as $NCM_{211}$), $LiNi_{0.6}Co_{0.2}Mn_{0.2}O_2$ (also abbreviated to as $NCM_{622}$), $LiNi_{0.8}Co_{0.1}Mn_{0.1}O_2$ (also abbreviated to as $NCM_{811}$)), a lithium nickel cobalt aluminum oxide (e.g. $LiNi_{0.85}Co_{0.15}Al_{0.05}O_2$), and modified compounds thereof, and the like. Examples of the lithium-containing phosphate of an olivine structure may include, but are not limited to, at least one of a lithium iron phosphate (e.g. $LiFePO_4$ (also abbreviated to as LFP)), a lithium iron phosphate and carbon composite, a lithium manganese phosphate (e.g. $LiMnPO_4$), a lithium manganese phosphate and carbon composite, a lithium iron manganese phosphate, and a lithium iron manganese phosphate and carbon composite.

In some embodiments, the positive electrode active material accounts for 75% to 99% by mass, optionally 80% to 97% by mass of the positive electrode film layer.

In some embodiments, the positive electrode film layer further optionally comprises a binder. As an example, the binder may comprise at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorine-containing acrylate resin.

In some embodiments, the binder accounts for 0.1% to 10% by mass, optionally 0.5% to 2.5% by mass of the positive electrode film layer.

In some embodiments, the positive electrode film layer further optionally comprises a conductive agent. As an example, the conductive agent may comprise at least one of superconducting carbon, acetylene black, carbon black, Ketjen black, carbon dots, carbon nanotubes, graphene, and carbon nanofibers.

In some embodiments, the conductive agent accounts for 0.05%-10% by mass, optionally 0.5%-3% by mass of the positive electrode film layer.

In some embodiments, the positive electrode plate may be prepared by means of the following method: dispersing the above-mentioned components for preparing the positive electrode plate, such as the positive electrode active material, the conductive agent, the binder and any other components, in a solvent (e.g., N-methylpyrrolidone) to form a positive electrode slurry; and coating the positive electrode current collector with the positive electrode slurry, followed by the procedures such as drying and cold pressing, so as to obtain the positive electrode plate.

[Negative Electrode Plate]

The negative electrode plate comprises a negative electrode current collector and a negative electrode film layer arranged on at least one surface of the negative electrode current collector, wherein the negative electrode film layer comprises a negative electrode active material.

As an example, the negative electrode current collector has two surfaces opposite in its own thickness direction, and the negative electrode film layer is arranged on either or both of the two opposite surfaces of the negative electrode current collector.

In some embodiments, the negative electrode current collector may be a metal foil or a composite current collector. For example, as a metal foil, a copper foil may be used. The composite current collector may comprise a polymer material base layer and a metal layer formed on at least one surface of the polymer material substrate. The composite current collector may be formed by means of forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material may be a negative electrode active material known in the art for batteries. As an example, the negative electrode active material may comprise at least one of the following materials: artificial graphite, natural graphite, soft carbon, hard carbon, a silicon-based material, a tin-based material, lithium titanate, etc. The silicon-based material may be selected from at least one of elemental silicon, a silicon oxide, a silicon carbon composite, a silicon nitrogen composite, and a silicon alloy. The tin-based material may be selected from at least one of elemental tin, a tin oxide, and a tin alloy. However, the present application is not limited to these materials, and other conventional materials that may be used as a negative electrode active material for batteries may also be used. These negative electrode active materials may be used alone or as a combination of two or more.

In some embodiments, the negative electrode plate may also be a metal lithium plate.

In some embodiments, the negative electrode active material accounts for 75%-99% by mass, optionally 80%-97% by mass of the negative electrode film layer.

In some embodiments, the negative electrode film layer further optionally comprises a binder. As an example, the binder may be selected from at least one of a styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the binder accounts for 0.1% to 3.5% by mass, optionally 0.5% to 2.5% by mass of the negative electrode film layer.

In some embodiments, the negative electrode film layer further optionally comprises a conductive agent. As an example, the conductive agent may be selected from at least one of superconductive carbon, acetylene black, carbon black, Ketjen black, carbon dots, carbon nanotubes, graphene, and carbon nanofibers.

In some embodiments, the conductive agent accounts for 0.04%-5% by mass, optionally 0.5%-3% by mass of the negative electrode film layer.

In some embodiments, the negative electrode film layer further optionally comprises other auxiliary agents, such as a thickener (e.g. sodium carboxymethyl cellulose (CMC-Na)), etc.

In some embodiments, the negative electrode plate may be prepared by means of the following method: dispersing the above-mentioned components for preparing the negative electrode plate, such as the negative electrode active material, the conductive agent, the binder and any other components, in a solvent (e.g. deionized water) to form a negative electrode slurry; and coating the negative electrode current collector with the negative electrode slurry, followed by procedures such as drying and cold pressing, so as to obtain the negative electrode plate.

[Electrolyte]

The electrolyte functions to conduct ions between the positive electrode plate and the negative electrode plate. The type of the electrolyte is not specifically limited in the present application, and may be selected according to actual requirements. For example, the electrolyte may be in a liquid state, a gel state or an all-solid state.

In some embodiments, the electrolyte is liquid and comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the solvent may also be an ether solvent, such as tetraethylene glycol dimethyl ether (TEGDME), ethylene glycol dimethyl ether (DME), 1,3-dioxolane (DOL), etc.

In some embodiments, the solvent may also be chain alkyl esters such as methyl propionate, and chain phosphotriesters such as trimethyl phosphate, etc.; a nitrile solvent such as 3-methoxypropionitrile; and a nonaqueous solvent (organic solvent) such as a branched-chain compound having an ether bond represented by a dendritic compound.

In some embodiments, the solvent may also be a fluorine-based solvent, for example a (perfluoroalkyl) alkyl ether of a linear structure such as $H(CF_2)_2OCH_3$, $C_4F_9OCH_3$, $H(CF_2)_2OCH_2CH_3$, $H(CF_2)_2OCH_2CF_3$, $H(CF_2)_2CH_2O(CF_2)_2H$, or $CF_3CHFCF_2OCH_3$, $CF_3CHFCF_2OCH_2CH_3$, that is, 2-trifluoromethylhexafluoropropyl methyl ether, 2-trifluoromethylhexafluoropropyl ethyl ether, 2-trifluoromethylhexafluoropropyl propyl ether, 3-trifluoromethyloctafluorobutyl methyl ether, 3-trifluoromethyloctafluorobutyl ethyl ether, 3-trifluoromethyloctafluorobutyl propyl ether, 4-trifluoromethyldecafluoropentyl methyl ether, 4-trifluoromethyldecafluoropentyl ethyl ether, 4-trifluoromethyldecafluoropentyl propyl ether, 5-trifluoromethyldodecafluorohexyl methyl ether, 5-trifluoromethyldodecafluorohexyl ethyl ether, 5-trifluoromethyldodecafluorohexyl propyl ether, 6-trifluoromethyltetradecafluoroheptyl methyl ether, 6-trifluoromethyltetradecafluoroheptyl ethyl ether, 6-trifluoromethyltetradecafluoroheptyl propyl ether, 7-trifluoromethylhexadecafluorooctyl methyl ether, 7-trifluoromethylhexadecafluorooctyl ethyl ether, 7-trifluoromethylhexadecafluorooctyl propyl ether, etc. In addition, a mixture of two or more of the above ether solvents may also be used.

In some embodiments, a concentration of the electrolyte salt in a nonaqueous electrolyte solution is for example 0.3 mol/L(mole/liter) or more, optionally 0.7 mol/L or more, optionally 1.7 mol/L or less, more optionally 1.2 mol/L or less.

In some embodiments, an electrolyte solution further optionally comprises an additive. As an example, the additive may comprise a negative electrode film-forming additive and a positive electrode film-forming additive, and may further comprise an additive that may improve some properties of the battery, such as an additive that improves the overcharge property of the battery, or an additive that improves the high-temperature or low-temperature property of the battery.

In some embodiments, an electrode assembly may be formed by a positive electrode plate, a negative electrode plate and a separator by a winding process or a stacking process.

In some embodiments, the secondary battery may comprise an outer package. The outer package may be used to encapsulate the above-mentioned electrode assembly and electrolyte.

In some embodiments, the outer package of the secondary battery may be a hard shell, for example, a hard plastic shell, an aluminum shell, a steel shell, etc. The outer package of the secondary battery may also be a soft bag, such as a pouch-type soft bag. A material of the soft bag may be plastics. As the plastics, polypropylene, polybutylene terephthalate, polybutylene succinate, etc. may be listed.

Figure 2:
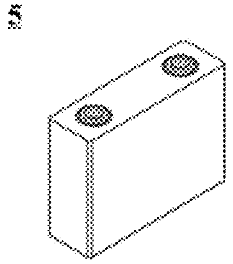
FIG. 2 is a schematic diagram of a secondary battery according to an embodiment of the present application.

The shape of the secondary battery is not particularly limited in the present application and may be cylindrical, square or of any other shape. For example, FIG. 2 shows a secondary battery 5 with a square structure as an example.

Figure 3:
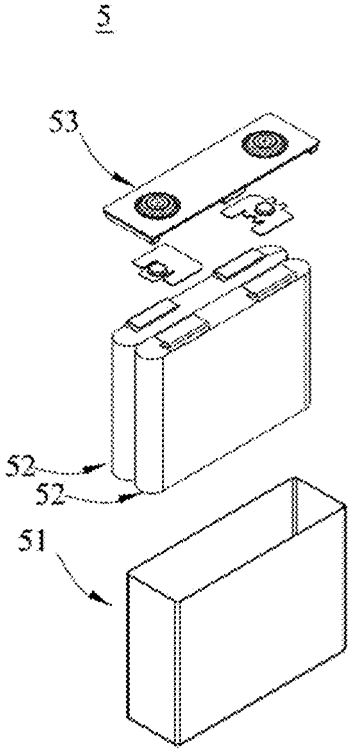
FIG. 3 is an exploded view of the secondary battery according to an embodiment of the present application as shown in FIG. 2.

In some embodiments, referring to FIG. 3, the outer package may comprise a shell body 51 and a cover plate 53. Herein, the shell body 51 may comprise a bottom plate and side plates connected to the bottom plate, and the bottom plate and the side plates enclose to form an accommodating cavity. The shell body 51 has an opening in communication with the accommodating cavity, and the cover plate 53 may cover the opening to close the accommodating cavity. The positive electrode plate, the negative electrode plate, and the separator may be subjected to a winding process or a laminating process to form an electrode assembly 52. The electrode assembly 52 is encapsulated in the accommodating cavity. The electrolyte solution infiltrates the electrode assembly 52. The number of the electrode assemblies 52 contained in the secondary battery 5 may be one or more, and may be selected by those skilled in the art according to actual requirements.

In some embodiments, the secondary battery may be assembled into a battery module, and the number of the secondary batteries contained in the battery module may be one or more, and the specific number may be selected by those skilled in the art according to the application and capacity of the battery module.

Figure 4:
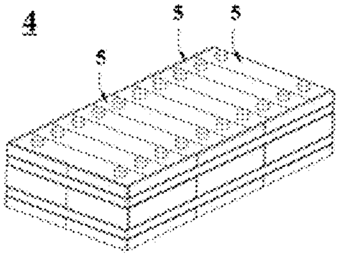
FIG. 4 is a schematic diagram of a battery module according to an embodiment of the present application.

FIG. 4 shows a battery module 4 as an example. Referring to FIG. 4, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may further comprise an outer shell with an accommodating space, and the plurality of secondary batteries 5 are accommodated in the accommodating space.

In some embodiments, the battery module may further be assembled into a battery pack, the number of the battery modules contained in the battery pack may be one or more, and the specific number may be selected by those skilled in the art according to the application and capacity of the battery pack.

Figure 5:
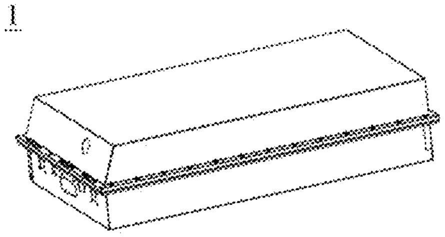
FIG. 5 is a schematic diagram of a battery pack according to an embodiment of the present application.
Figure 6:
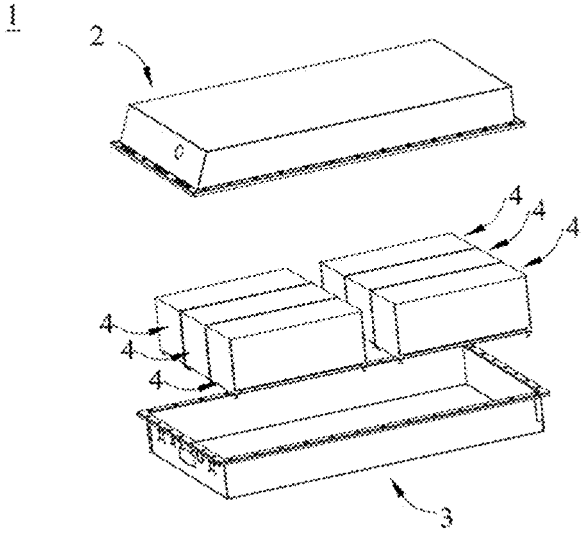
FIG. 6 is an exploded view of the battery pack according to an embodiment of the present application as shown in FIG. 5.

FIGS. 5 and 6 show a battery pack 1 as an example. Referring to FIG. 5 and FIG. 6, the battery pack 1 may comprise a battery box and a plurality of battery modules 4 arranged in the battery box. The battery box comprises an upper box body 2 and a lower box body 3, wherein the upper box body 2 may cover the lower box body 3 to form a closed space for accommodating the battery modules 4. The plurality of battery modules 4 may be arranged in the battery box in any manner.

In addition, the present application further provides a power consuming device. The power consuming device comprises at least one of the secondary battery, the battery module, or the battery pack provided by the present application. The secondary battery, the battery module or the battery pack may be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship and a satellite, an energy storage system, etc., but is not limited thereto.

As for the power consuming device, the secondary battery, the battery module or the battery pack may be selected according to the use requirements thereof.

Figure 7:
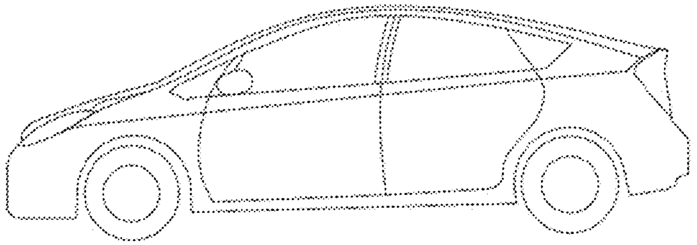
FIG. 7 is a schematic diagram of a power consuming device using a secondary battery according to an embodiment of the present application as a power source.

FIG. 7 shows a power consuming device as an example. The power consuming device may be a pure electric vehicle, a hybrid electric vehicle, a plug-in hybrid electric vehicle, etc. In order to meet the requirements of the power consuming device for a high power and a high energy density of the secondary battery, the battery pack or the battery module may be used.

The beneficial effects of the present application will be further described below in conjunction with examples.

EXAMPLES

Hereinafter the examples of the present application will be explained. The examples described below are exemplary and merely for explaining the present application, and should not be construed as limiting the present application. The examples in which techniques or conditions are not specified are based on the techniques or conditions described in references in the art or according to the product introduction. The reagents or instruments used therein for which manufacturers are not specified are all conventional products that are commercially available.

Example 1

[Preparation of Separator]

Step 1: 5 g of SiO2 (Dv50=100 nm) was uniformly dispersed into 100 g of N-methylpyrrolidone (NMP), and ultrasonically dispersed for 2 hours to obtain a uniform dispersion.

Step 2: 20 g of polyvinylidene fluoride (PVDF, Mn=30,000) was added to the dispersion obtained in step 1, and magnetically stirred for 3 hours (at a rotating speed of 800 rpm) until same is uniformly dispersed. The obtained solution was centrifuged (at a rotating speed of 10,000 rpm), followed by drying (120° C., 12 hours) and ball milling (a particle size of the ball milling was 5 μm) to obtain 7.5 g of $SiO_2$ particles having a surface coated with polyvinylidene fluoride.

Step 3: the $SiO_2$ having a surface coated with polyvinylidene fluoride obtained in step 2 and 5 g of $SiO_2$ having an uncoated surface were added together to NMP, 0.2 g of carboxymethyl cellulose (CMC), 0.2 g of hydrolytic polymaleic anhydride, and 0.1 g of sodium hydroxymethyl cellulose were added, and magnetically stirred for 2 hours (at a rotating speed of 800 rpm) to obtain a coating material for coating a substrate with a solid content of 46%.

Step 4: the coating material obtained in step 3 was uniformly coated onto a polypropylene (PP) film (with a porosity of 40%) having a thickness of 7 μm by means of blade coating, then another polypropylene film having a thickness of 7 μm covered the side, coated with the coating material, of the PP film, and then hot-pressing (at a temperature of 120° C., a pressure of 5 MPa, for 5 minutes) and vacuum-drying (100° C. and 12 hours) were performed to obtain the separator of the present application having a thickness of 17 μm, wherein the coating had a thickness of 3 μm and a coating amount of 13 $g/m^2$.

Example 2

A method for preparing a separator was basically the same as that in example 1, except that silicon dioxide was replaced with ferric oxide (Dv50=100 nm).

Example 3

A method for preparing a separator was basically the same as that in example 1, except that silicon dioxide was replaced with stannic oxide (Dv50=100 nm).

Example 4

A preparation method thereof was basically the same as that in example 1, except that silicon dioxide was replaced with titanium dioxide (Dv50=100 nm).

Example 5

A method for preparing a separator was basically the same as that in example 1, except that silicon dioxide was replaced with copper oxide (Dv50=100 nm).

Example 6

A preparation method thereof was basically the same as that in example 1, except that 4 g of $SiO_2$ was used in step 1 and 6 g of $SiO_2$ was used in step 2.

Example 7

A method for preparing a separator was basically the same as that in example 1, except that 6 g of $SiO_2$ was used in step 1 and 4 g of $SiO_2$ was used in step 2.

Example 8

A preparation method thereof was basically the same as that in example 1, except that 3 g of $SiO_2$ was used in step 1 and 7 g of $SiO_2$ was used in step 2.

Example 9

A method for preparing a separator was basically the same as that in example 1, except that 7 g of $SiO_2$ was used in step 1 and 3 g of $SiO_2$ was used in step 2.

Comparative Example 1

A preparation method thereof was basically the same as that in example 1, except that $SiO_2$ having a surface coated with polyvinylidene fluoride was used for all the inorganic particles in the coating material.

Comparative Example 2

A method for preparing a separator was basically the same as that in example 1, except that $SiO_2$ having an uncoated surface was used for all the inorganic particles in the coating material.

Comparative Example 3

A method for preparing a separator was basically the same as that in example 1, except that the separator did not contain a coating.

[Performance Test]

Test for Tensile Strength (Transverse Direction, TD) of Separator

The separator to be tested was cut into a size of 10 mm in width and ≥150 mm in length according to the specifications in ASTM D882-09 and stretched at a rate of 500 mm/min using a universal tensile machine. A maximum load value at the time of breaking a test sample was obtained and then divided by the cross-sectional area (width of test sample× thickness of substrate) of the separator, and the tensile strength of the separator was calculated.

Test for Peel Force of Separator

A 20 mm wide standard adhesive tape (31B, purchased from Nitto®) was attached to a coating surface of the separator (for a purpose of test, the separator comprised only one layer of polypropylene film and a coating coated thereon) with a constant stress (2 kg, 300 mm/min) by means of a roller press, a 180 degree peel test was performed at a speed of 300 mm/min by means of a tensile tester, and peel force values at 50 points were obtained in a test distance of 50 mm to 120 mm and an average value was calculated.

Test for Wettability of Separator

The separator to be tested (for a purpose of test, the separator comprised only one layer of polypropylene film and a coating coated thereon) was cut into a size of 50 mm×50 mm, 1 mL of a standard electrolyte solution (1 M of $LiPF_6$ dissolved in an electrolyte solution formed by means of mixing ethylene carbonate (EC), ethyl methyl carbonate (EMC), and dimethyl carbonate (DMC) at a weight ratio of 1:1:1) was dropped on one side of the coating of the separator, and an angle between a liquid drop and the separator was observed by means of a contact angle meter.

Test for Electrolyte Solution Absorption Rate of Separator

The separator was soaked in an electrolyte solution (1 M of $LiPF_6$ dissolved in ethylene carbonate (EC), ethyl methyl carbonate (EMC), and dimethyl carbonate (DMC) at a weight ratio of 1:1:1) for 60 min, the separator was taken out every other 10 min and air-dried, the weight of the separator was measured, and an electrolyte solution absorption rate may be obtained from (weight of separator after solution absorption-weight of initial separator)/weight of initial separator. The higher electrolyte solution absorption rate indicated a better wettability of the separator.

Test results were listed in Table 1.

TABLE 1

| | Weight percentage of inorganic particles having a surface coated with a coating layer to inorganic particles having an uncoated surface, based on all inorganic particles | Tensile strength (TD)/MPa | Peel force/N | Wetting angle/° | Electrolyte solution absorption rate/% |
|---|---|---|---|---|---|
| Example 1 | 50%:50% | 22 | 60 | 15 | 217 |
| Example 2 | 50%:50% | 21 | 58 | 16 | 211 |
| Example 3 | 50%:50% | 22 | 59 | 16 | 215 |
| Example 4 | 50%:50% | 20 | 56 | 17 | 208 |
| Example 5 | 50%:50% | 21 | 57 | 18 | 200 |
| Example 6 | 40%:60% | 23 | 61 | 20 | 196 |
| Example 7 | 60%:40% | 21 | 55 | 18 | 202 |
| Example 8 | 30%:70% | 24 | 64 | 22 | 190 |
| Example 9 | 70%:30% | 19 | 54 | 18 | 199 |
| Comparative example 1 | 100%:0% | 23 | 60 | 22 | 187 |
| Comparative example 2 | 0%:100% | 18 | 52 | 14 | 224 |
| Comparative example 3 | — | 13 | 48 | 68 | 160 |

It may be seen from Table 1 that the separator of the present application had an equal or even better mechanical strength, wettability, and electrolyte solution absorption rate as compared to the separator of the prior art.

[Test for Discharge Rate of Separator]

1) A test for a discharge rate was performed by means of a CR2025-type button battery, in which a positive electrode current collector of the battery was an aluminum foil, a positive electrode active material was lithium iron phosphate, wherein a weight ratio of the lithium iron phosphate:conductive carbon black:a PVDF binder was 8:1:1, a negative electrode was a lithium plate, an electrolyte solution was 250 μL of 1 M $LiPF_6$ (a weight ratio of ethylene carbonate (EC): diethyl carbonate (DEC) in a solvent was 1:1), and the separator was a separator of the examples and comparative examples above.

2) Charging conditions: The battery was charged at room temperature using a constant current-constant voltage mode (CC-CV mode). Firstly, the battery was charged to a voltage of 3.65 V at a constant current of 0.1 C in a constant current mode, the mode was then switched to a constant voltage mode, and the cut-off current was 0.02 C when the battery was fully charged.

3) Discharging conditions: The battery was discharged to 2.5 V in a constant current mode at different discharge rates (C-rate: 0.1 C/1 C/3 C), and 20 cycles were performed.

4) Coulombic efficiencies (discharge capacity/charge capacity*100%) at different discharge rates after 200 cycles were calculated and recorded. Specific results were shown in Table 2 below.

TABLE 2

| | Coulombic efficiency/% | | |
|---|---|---|---|
| | 0.1 C | 1 C | 3 C |
| Example 1 | 99.4 | 96.1 | 89.7 |
| Example 2 | 98.5 | 95.8 | 89.3 |
| Example 3 | 98.9 | 95.9 | 87.8 |
| Example 4 | 98.7 | 95.5 | 88.1 |
| Example 5 | 99.0 | 94.9 | 88.5 |
| Example 6 | 98.1 | 95.4 | 87.8 |
| Example 7 | 98.5 | 95.8 | 87.1 |
| Example 8 | 97.7 | 95.9 | 87.0 |
| Example 9 | 97.9 | 95.6 | 86.9 |
| Comparative example 1 | 96.8 | 94.7 | 82.5 |
| Comparative example 2 | 96.4 | 94.0 | 83.1 |
| Comparative example 3 | 88.9 | 80.1 | 71.2 |

As shown in Table 2, the secondary batteries using the separator of the present 5 application all had superior coulombic efficiencies to the secondary batteries using the separator of the comparative examples, indicating that the dendrite resistance and cycling performance of the separators were significantly improved under both low rate and high rate current cycles.

It should be noted that the present application is not limited to the above embodiments. The above embodiments are exemplary only, and any embodiment that has substantially the same constitutions as the technical ideas and has the same effects within the scope of the technical solution of the present application falls within the technical scope of the present application. In addition, without departing from the gist of the present application, various modifications that may be conceived by those skilled in the art to the embodiments, and other modes constructed by combining some of the constituent elements of the embodiments also fall within the scope of the present application.

The invention claimed is:

1. A separator, comprising: two layers of substrate and a coating formed between the two layers of substrate, wherein the coating contains inorganic particles, and 30 wt % to 70 wt % of the inorganic particles have a surface coated with a coating layer, and 70 wt % to 30 wt % of the inorganic particles have an uncoated surface, based on a total weight of the inorganic particle weight of all the inorganic particle in the coating, wherein the inorganic particles are selected from at least one of $SiO_2$, Si, SiO, $SnO_2$, $Fe_2O_3$, NiO, CuO, $TiO_2$, and $FePO_4$, a material forming the coating layer is selected from at least one of polyvinylidene fluoride (PVDF), polydopamine (PDA), polyaniline (PAn), polyimide (PI), and polymethyl methacrylate (PMMA), wherein in the inorganic particles having a surface coated with the coating layer, a mass ratio of the coating layer to the inorganic particle coated with the coating layer is (0.1-2):1.

2. The separator according to claim 1, wherein the inorganic particles comprises $SiO_2$.

3. The separator according to claim 1, wherein the inorganic particles have a particle size Dv50 of 0.01 μm to 10 μm.

4. The separator according to claim 1, wherein a material forming the coating layer is selected from at least one of polydopamine (PDA), polyaniline (PAn), polyimide (PI), and polymethyl methacrylate (PMMA).

5. The separator according to claim 1, wherein for each of the inorganic particles having a surface coated with the coating layer, a mass ratio of the coating layer to the coated inorganic particle is (0.1-6):1.

6. The separator according to claim 1, wherein the coating layer has a thickness of 3 nm to 10 nm.

7. The separator according to claim 1, wherein the coating has a thickness of 1 μm to 10 μm;

the separator has a thickness of 10 μm to 20 μm.

8. The separator according to claim 1, wherein the coating contains 80 wt % to 99 wt % of the inorganic particle;

1 wt % to 5 wt % of a binder;

1 wt % to 3 wt % of a dispersant;

0.1 wt % to 1 wt % of a thickener, all based on a total weight of the coating;

the binder is selected from at least one of sodium carboxymethylcellulose (CMC) and styrene butadiene rubber (SBR);

the dispersant is selected from at least one of hydrolytic polymaleic anhydride, an acrylic block polymer, a polyester block polymer, a polyethylene glycol-type polyol, and a polyethyleneimine derivative;

the thickener is selected from at least one of sodium carboxymethylcellulose, methylcellulose, hydroxyethyl cellulose, hydroxypropyl methylcellulose, polyacrylate, polyurethane, and polyether.

9. The separator according to claim 1, wherein a material forming the substrate is selected from at least one of polypropylene, polyethylene, polyamide, polyester, polytetrafluoroethylene, polyvinylidene fluoride, and polyvinyl chloride;

the substrate has a thickness of 3 μm to 30 μm;

the substrate is a porous film having a porosity of 30% to 80%;

the material forming the substrate has a number-average molecular weight of 100,000-1,000,000 g/mol.

10. A secondary battery, comprising a separator according to claim 1.

11. The separator according to claim 1, wherein the separator has a thickness of 10 μm to 20 μm.

12. The separator according to claim 1, wherein the inorganic particles are $SnO_2$.

13. The separator according to claim 1, wherein the inorganic particles are $Fe_2O_3$.

14. The separator according to claim 1, wherein the inorganic particles are NiO.

15. The separator according to claim 1, wherein the inorganic particles are CuO.

16. The separator according to claim 1, wherein the inorganic particles are $TiO_2$.

17. The separator according to claim 1, wherein the inorganic particles are $FePO_4$.

18. The separator according to claim 1, wherein 45 wt % to 55 wt % of the inorganic particles have a surface coated with a coating layer, and 55 wt % to 45 wt % of the inorganic particles have an uncoated surface, based on a total weight of all the inorganic particle in the coating.

* * * * *